Patented Nov. 16, 1937

2,099,352

UNITED STATES PATENT OFFICE 2,099,352

BITUMINOUS EMULSION

Preston R. Smith, Rahway, N. J., assignor, by mesne assignments, to The Barber Company, Inc., Philadelphia, Pa., a corporation of New Jersey No Drawing. Application January 27, 1934, Serial No. 708,700

13 Claims. (Cl. 134—1)

This invention relates to bituminous emulsions, and more particularly to emulsions of the clay type, dried films of which are rendered resistant to water by the incorporation in the emulsions and in the films resulting therefrom of certain substances.

Emulsions of certain types consisting only of an emulsifying agent, a bitumen and water give dry films which are fairly resistant to the action of water. That is, reemulsification does not tend to take place readily so that surfaces carrying films of the emulsion may be exposed to the weather, i. e. rain or dampness, without substantial effect thereon. On the other hand, various bituminous emulsions, notably those in which clay is used as the emulsifying agent, give films which are very sensitive to the action of water, reemulsification taking place very readily. It has been found that the addition of various substances to such emulsions will render the films substantially unaffected by the action of water.

The present invention relates to bituminous emulsions particularly of the clay type in which a material such as bentonite, or other colloidal clay or insoluble metallic oxide, hydroxide or silicate having a substantial proportion of particles of a colloidal character, is used as the emulsifying agent and in which there is incorporated a salt of copper, or silver, which will prevent reemulsification of dry films resulting from evaporation of water from the emulsion. As will be pointed out, salts of both copper and silver give substantially the same results and for the purpose of the invention, particularly as regards the scope of the claims, they are to be considered as equivalent.

To illustrate the action of copper and silver salts in rendering the films resulting from the emulsion resistant to water, the effects produced by the addition of various substances in accordance with the present invention will be considered when these substances are added to a basic bituminous emulsion, films or coatings of which are destroyed very readily by the application of water. This basic emulsion which will be hereafter discussed is a water emulsion in which bentonite is used as the emulsifying agent and has the following composition:

| | Percent Percent |
|---|---|
| Bitumen | 45 to 67, preferably 50 |
| Bentonite | 2 to 10, preferably 7.5 |
| Water | 35 to 55, preferably 43.5 |

In the following examples where a percentage of salt in the emulsion is given it means that the finished emulsion contained the indicated quantity of the salt.

If cupric sulphate, $CuSO_4.5H_2O$, is incorporated in the above emulsion in amounts ranging from 0.1% to 10% the resulting films are unaffected by water. The copper sulphate does not appear to thicken the emulsion and does not alter its smooth appearance.

If instead of cupric sulphate, cupric ammonium sulphate or cupric potassium sulphate is used similar results are obtained.

Cupric acetate, $Cu(C_2H_3O_2)_2.H_2O$, if used in percentages ranging from 1 to 10% produces films resistant to water. However, in this case the emulsion is considerably thickened.

Cupric fluoride, $CuF_2.2H_2O$, or cupric ammonium fluoride, $CuF_2.2NH_4F.2H_2O$, when used in amounts from 1 to 10% produces films completely resistant to the action of water. In both cases the emulsion is somewhat thickened.

Cuprous chloride, $Cu_2Cl_2$, is effective in percentages ranging from 1 to 10% to produce films which are not acted on by water. Although the film is not washed out by the action of the water it turns brown when placed in water.

Cupric nitrate $Cu(NO_3)_2.3H_2O$, is effective in amounts from 1 to 10% in producing water resistant films. The nitrate thickens the emulsion and the dried film turns brown in water.

Cuprous thiocyanate, CuCNS, in amounts from 1 to 10% thickens the emulsion and produces films which are water resistant. Cuprous thiocyanate is not very soluble in water.

Cupric dichromate, $CuCr_2O_7.2H_2O$, in amounts from .06% to 10%, and cupric ammonium chromate in amounts from 0.5% to 10% produce water resistant emulsions.

Cupric hydroxide, $Cu(OH)_2$, in amounts from 0.5% to 10% produces films unaffected by water. Cupric hydroxide, prepared as a blue colloidal precipitate, does not thicken the emulsion.

Cuprous bromide, $Cu_2Br_2$, in amounts from 2 to 10% thickens the emulsion slightly and produces films which are unaffected by water. Cupric bromide $CuBr_2$, will produce water resistant films when used in amounts from 0.5% to 10%. Of these bromides, cuprous bromide is relatively insoluble in water while cupric bromide is very soluble. The latter, it will be noted, is more effective perhaps because of its greater solubility.

Silver nitrate, $AgNO_3$, and silver sulphate, $Ag_2SO_4$, act similarly to the copper salts being effective in proportions from .05% to 10% to produce emulsions which are unaffected by water.

A particular result is noted in connection with the use of copper and silver salts in that when incorporated in emulsions they apparently have little or no effect on iron, although it would normally be expected that iron would be considerably corroded thereby.

From the above it will be seen that dried films of clay emulsions produced by evaporation of water are rendered resistant to water by the addition of very small amounts of salts of copper and silver, this being especially true when the salts are those of monobasic acids.

While the above examples are given with reference to an emulsion which gives films of very poor character from the standpoint of water resistance similar results are found to be given with other clay emulsions. If the basic clay emulsion used is of a character giving films having substantial resistance to water, then it is possible to use much lower percentages of the added substances to attain complete resistance to washing.

The various substances can be added to the previously formed emulsion or may be added to the clay before the asphalt is emulsified thereby. So long as the substance is finally incorporated in the emulsion it does not seem to be material how the addition thereof is effected.

Inasmuch as the copper and silver salts appear to act equivalently where copper is referred to in the following claims, it is intended that silver is included within the meaning of this term as an equivalent for copper.

What I claim and desire to protect by Letters Patent is:

1. An aqueous clay emulsion of bitumen of the oil-in-water type containing a copper salt of a monobasic acid in amount capable of rendering dry films formed from the emulsion substantially resistant to water.

2. An aqueous clay emulsion of bitumen of the oil-in-water type containing a copper halide in amount capable of rendering dry films formed from the emulsion substantially resistant to water.

3. A bituminous coating formed by the evaporation of water from an aqueous clay emulsion of bitumen of the oil-in-water type containing a copper salt of a monobasic acid, the coating being substantially resistant to water.

4. A bituminous coating formed by the evaporation of water from an aqueous clay emulsion of bitumen of the oil-in-water type containing a copper halide, the coating being substantially resistant to water.

5. An aqueous clay emulsion of bitumen of the oil-in-water type containing a non-saponaceous copper salt of a monobasic acid in amount capable of rendering dry films formed from the emulsion substantially resistant to water.

6. An aqueous clay emulsion of bitumen of the oil-in-water type containing a salt from the group consisting of copper and silver salts of monobasic acids in amount capable of rendering dry films formed from the emulsion substantially resistant to water.

7. A bituminous coating formed by the evaporation of water from an aqueous clay emulsion of bitumen of the oil-in-water type containing a salt from the group consisting of copper and silver salts of monobasic acids, the coating being substantially resistant to water.

8. An aqueous clay emulsion of bitumen of the oil-in-water type containing a non-saponaceous, organic copper salt of a monobasic acid in amount capable of rendering dry films formed from the emulsion substantially resistant to water.

9. A bituminous coating formed by the evaporation of water from an aqueous clay emulsion of bitumen of the oil-in-water type containing a non-saponaceous, organic copper salt of a monobasic acid, the coating being substantially resistant to water.

10. An aqueous clay emulsion of bitumen of the oil-in-water type containing copper chloride in amount capable of rendering dry films formed from the emulsion substantially resistant to water.

11. A bituminous coating formed by the evaporation of water from an aqueous clay emulsion of bitumen of the oil-in-water type containing copper chloride, the coating being substantially resistant to water.

12. An aqueous clay emulsion of bitumen of the oil-in-water type containing copper nitrate in amount capable of rendering dry films formed from the emulsion substantially resistant to water.

13. A bituminous coating formed by the evaporation of water from an aqueous clay emulsion of bitumen of the oil-in-water type containing copper nitrate, the coating being substantially resistant to water.

PRESTON R. SMITH.